United States Patent [19]

O'Donnell

[11] Patent Number: 5,291,892
[45] Date of Patent: Mar. 8, 1994

[54] ULTRASONIC FLOW IMAGING

[75] Inventor: Matthew O'Donnell, Ann Arbor, Mich.

[73] Assignee: General Electric Company, Schenectady, N.Y.

[21] Appl. No.: 787,422

[22] Filed: Nov. 4, 1991

[51] Int. Cl.$^5$ .............................................. A61B 8/06
[52] U.S. Cl. ........................... 128/661.08; 128/661.09
[58] Field of Search ..................... 128/661.08, 661.09, 128/661.10, 916; 73/861.25

[56] References Cited

U.S. PATENT DOCUMENTS

| | | | |
|---|---|---|---|
| 4,154,113 | 5/1979 | Engeler | 73/626 |
| 4,155,258 | 5/1979 | Engeler et al. | 73/626 |
| 4,155,259 | 5/1979 | Engeler | 73/626 |
| 4,155,260 | 5/1979 | Engeler et al. | 73/626 |
| 4,180,790 | 12/1979 | Thomas | 367/7 |
| 4,182,173 | 1/1980 | Papadofrangakis et al. | 73/194 |
| 4,217,909 | 8/1980 | Papadofrangakis et al. | 128/663 |
| 4,257,278 | 3/1981 | Papadofrangakis et al. | 73/861.25 |
| 4,265,126 | 5/1981 | Papadofrangakis et al. | 73/861.25 |
| 4,470,303 | 9/1984 | O'Donnell | 73/602 |
| 4,530,363 | 7/1985 | Brisken | 128/663 |
| 4,567,898 | 2/1986 | Plugge et al. | 128/660 |
| 4,587,973 | 5/1986 | Flax | 128/663 |
| 4,662,223 | 5/1987 | Riley et al. | 73/626 |
| 4,669,314 | 6/1987 | Magrane | 73/610 |
| 4,809,184 | 2/1989 | O'Donnell et al. | 364/413.25 |
| 4,835,689 | 5/1989 | O'Donnell | 364/413.25 |
| 4,839,652 | 6/1989 | O'Donnell et al. | 341/122 |
| 4,886,069 | 12/1989 | O'Donnell | 128/661.01 |
| 4,896,287 | 1/1990 | O'Donnell et al. | 364/754 |
| 4,983,970 | 1/1991 | O'Donnell et al. | 341/122 |
| 5,014,712 | 5/1991 | O'Donnell | 128/661.01 |
| 5,062,430 | 11/1991 | Bonnefous | 128/661.09 |
| 5,081,996 | 1/1992 | Kawasaki et al. | 128/661.09 |
| 5,105,816 | 4/1992 | Shimura et al. | 128/661.08 |

FOREIGN PATENT DOCUMENTS

| | | | |
|---|---|---|---|
| 0010974 | 5/1980 | European Pat. Off. | 73/861.25 |
| 0229070 | 7/1987 | European Pat. Off. | 128/661.08 |
| 0312059 | 4/1989 | European Pat. Off. | 128/661.08 |

OTHER PUBLICATIONS

O. Bonnefous et al., "Time Domain Formulation of Pulse–Doppler Ultrasound and Blood Velocity Estimation by Cross Correlation", Ultrasonic Imaging 8, pp. 73–85 (1986).
P. M. Embree et al., "The Accurate Ultrasonic Measurement of the Volume Flow of Blood by Time Domain Correlation", IEEE 1985 Ultrasonics Symposium, pp. 963–966.
G. E. Trahey et al., "Measurement of Local Speckle Pattern Displacement to Track Flow in Two Dimensions", IEEE 1987 Ultrasonic Symposium, pp. 957–961.
S. C. Leavitt et al., "A Scan Conversion Algorithm for Displaying Ultrasound Images", Hewlett-Packard Journal, Oct., 1983, pp. 30–33.

Primary Examiner—William E. Kamm
Assistant Examiner—George Manuel
Attorney, Agent, or Firm—Marvin Snyder

[57] ABSTRACT

A phased array sector scanning ultrasonic imaging system produces simultaneously, and samples, three receive beams for each transmitted ultrasonic pulse directed upon flowing reflectors. Flow velocity is measured in the cross range direction using a correlation technique while flow velocity in the range direction is simultaneously measured using a Doppler method. By performing cross correlation in both the range and cross range directions with data acquired from a set of such multi-beam acquisitions, a B-scan image is produced which indicates both magnitude and direction of the flowing reflectors.

9 Claims, 11 Drawing Sheets

ULTRASONIC FLOW IMAGING

BACKGROUND OF THE INVENTION

This invention relates to coherent imaging using vibratory energy, such as ultrasound and the like and, in particular, to ultrasound imaging of flowing tissues such as blood.

There are a number of modes in which ultrasound can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude or time-of-flight of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the refractors in the object and the time delay is proportional to the range of the refractors from the transducer. In the so-called "B-scan" method, the transducer transmits a series of ultrasonic pulses as it is scanned across the object along a single axis of motion. The resulting echo signals are recorded as with the A-scan method and either their amplitude or time delay is used to modulate the brightness of pixels on a display. With the B-scan method, enough data are acquired from which an image of the refractors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage is applied, the piezoelectric elements change in size at a frequency corresponding to that of the applied voltage. When a voltage pulse is applied, the piezoelectric element emits an ultrasonic wave into the media to which it is coupled at the frequencies contained in the excitation pulse. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere. A number of such ultrasonic transducer constructions are disclosed in U.S. Pat. Nos. 4,217,684, 4,425,525, 4,441,503, 4,470,305 and 4,569,231, all of which are assigned to the instant assignee.

When used for ultrasound imaging, the transducer typically has a number of piezoelectric elements arranged in an array and driven with separate voltages (apodizing). By controlling the time delays (or phase) and amplitude of the applied voltages, the ultrasonic waves produced by the piezoelectric elements (transmission mode) combine to produce a net ultrasonic wave focused at a selected point. By controlling the time delays and amplitude of the applied voltages, this focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delays (and/or phase shifts) and gains to the signal from each transducer array element.

This form of ultrasonic imaging is referred to as "phased array sector scanning", or "PASS". Such a scan is comprised of a series of measurements in which the focused ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along a scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258, 4,155,260, 4,154,113, 4,155,259, 4,180,790, 4,470,303, 4,662,223, 4,669,314 and 4,809,184, all of which are assigned to the instant assignee.

The use of ultrasonic imaging systems to measure the velocity of moving tissues such as blood has many clinical applications. For example, an image of the heart in which pixel brightness is determined by the velocity of the reflecting tissues can provide valuable information concerning the mechanical motion of the heart and the flow of blood through its chambers during a cardiac cycle. There are two well known methods for producing such images using phased array sector scanning techniques—Doppler measurements and correlation measurements.

Ultrasonic echoes backscattered from moving tissues such as blood are frequency shifted by an amount proportional to the frequency of the ultrasonic sound and the velocity of the blood flow. Movement of red blood cells through the sample volume toward the transducer array compresses the wavelength of the reflected echo, increasing its frequency, whereas movement of red blood cells away from the transducer array lengthens the wavelength of the echo, decreasing its frequency. The Doppler method measures only the component of mean velocity in the same direction as the transmitted ultrasonic beam. The formula relating Doppler frequency shift to velocity in the beam direction is:

$$\Delta f = 2f_0 v/c$$

where
$\Delta f$ = frequency shift,
$f_0$ = ultrasonic carrier frequency,
$v$ = mean velocity of flow in the beam direction,
$c$ = speed of sound in the tissue (1450 mm/sec).

In typical systems using a carrier frequency of 2-5 MHz, human blood flows produce Doppler frequency shifts of about 0.2 to 8 kHz. Ultrasonic imaging systems which produce Doppler flow images are described in U.S. Pat. Nos. 4,217,909; 4,265,126; 4,182,173; 4,257,278; and 4,530,363, all of which are assigned to the instant assignee.

The second method used to produce ultrasonic flow images correlates the signals produced by two echoes to determine the distance moved by the blood cells between the two ultrasonic beam transmissions. The two transmissions may be directed in the same beam angle and the amplitude of the sampled echo signals correlated with each other to determine the amount of shift in position which takes place between transmissions along the beam direction. Since the time interval between transmissions is known, this measured displacement can be used to calculate velocity. The same method can be used to measure flow velocity across the direction of the beam by emitting a series of beams at different beam angles and then correlating the amplitudes of the received echo signals in both the beam and the cross beam direction. Such correlation ultrasonic imaging systems are described in U.S. Pat. Nos. 4,587,973 and 4,567,898, which are assigned to the instant assignee, and in articles by O. Bonnefous et al. in *Ultrasonic Imaging* 8, pp. 73-85 (1986) entitled "Time Domain Formulation Of Pulse-Doppler Ultrasound And Blood Velocity Estimation By Gross Correlation"; by P. M. Embree et al. in *IEEE 1985 Ultrasonics Symposium*, pp. 963-66 entitled "The Accurate Ultrasonic Measurement Of The Volume Flow Of Blood By Time Domain Correlation"; and by Gregg E. Trahey et al. in *IEEE 1987 Ultrasonic Symposium*, pp. 957-61, entitled "Measurement of Local Speckle Pattern Displacement to Track Blood Flow in Two Dimensions." To correlate in the cross beam direction, however, a plurality of beams at different beam angles must be produced to provide a magnitude envelope in the cross beam direction and the process must be repeated again to produce a second envelope which can be correlated with the first envelope.

SUMMARY OF THE INVENTION

The present invention relates to a method and apparatus for producing an image with a phased array ultrasonic system which indicates flow velocity and direction. More specifically, the ultrasonic system transmits a first beam directed at an angle $\theta$ and receives and samples the resulting echo signals for a set of receive beams disposed around the beam angle $\theta$ and stored in a first input buffer; the system then transmits a second beam directed at the same angle $\theta$ and receives and samples the resulting echo signals for a set of receive beams disposed around the beam angle $\theta$ and stored in a second input buffer; and a correlation measurement of the flow of a reflector at a sample range on the beam at angle $\theta$ is made in both the range direction and the cross range direction using the sample data in the first and second input buffers, and the two-dimensional flow measurement is employed to control the pixel in a two-dimensional image which corresponds in location to the sample range and beam angle $\theta$. The two-dimensional correlation measurement of flow is repeated at a series of sample ranges to control the corresponding pixels in the two-dimensional image in a line along the beam angle $\theta$; and then the process is repeated for other beam angles to control all of the image pixels.

A general object of the invention is to provide both range direction and cross range direction flow measurements. By simultaneously producing a set of receive beams with each echo which "fan out" in the cross range direction, the correlation flow measurements can be made simultaneously in both the range and cross range directions.

Another object of the invention is to provide a measurement of both flow direction and velocity. Because the range and cross range velocity components are both measured simultaneously, they can be combined to indicate total flow velocity in the two-dimensional plane of the image, and the direction of that flow. Flow velocity can, for example, be used to control pixel brightness and the flow direction output can be employed to control pixel color.

A more specific object of the invention is to measure flow velocity in the cross range direction using a correlation technique and to simultaneously measure flow velocity in the range direction using a Doppler method. At longer ranges where signal-to-noise ratios are low the Doppler method is more robust than the correlation method and is employed to measure flow in the range direction. A correlation measurement can also be made and used to detect aliasing in the Doppler measurement, and of course, the correlation method must be employed to measure cross range velocity.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIGS. 2A and 2B are graphical illustrations of the signal in any of the channels of transmitter 50 of FIG. 2;

DESCRIPTION OF THE PREFERRED EMBODIMENT

Figure 1:
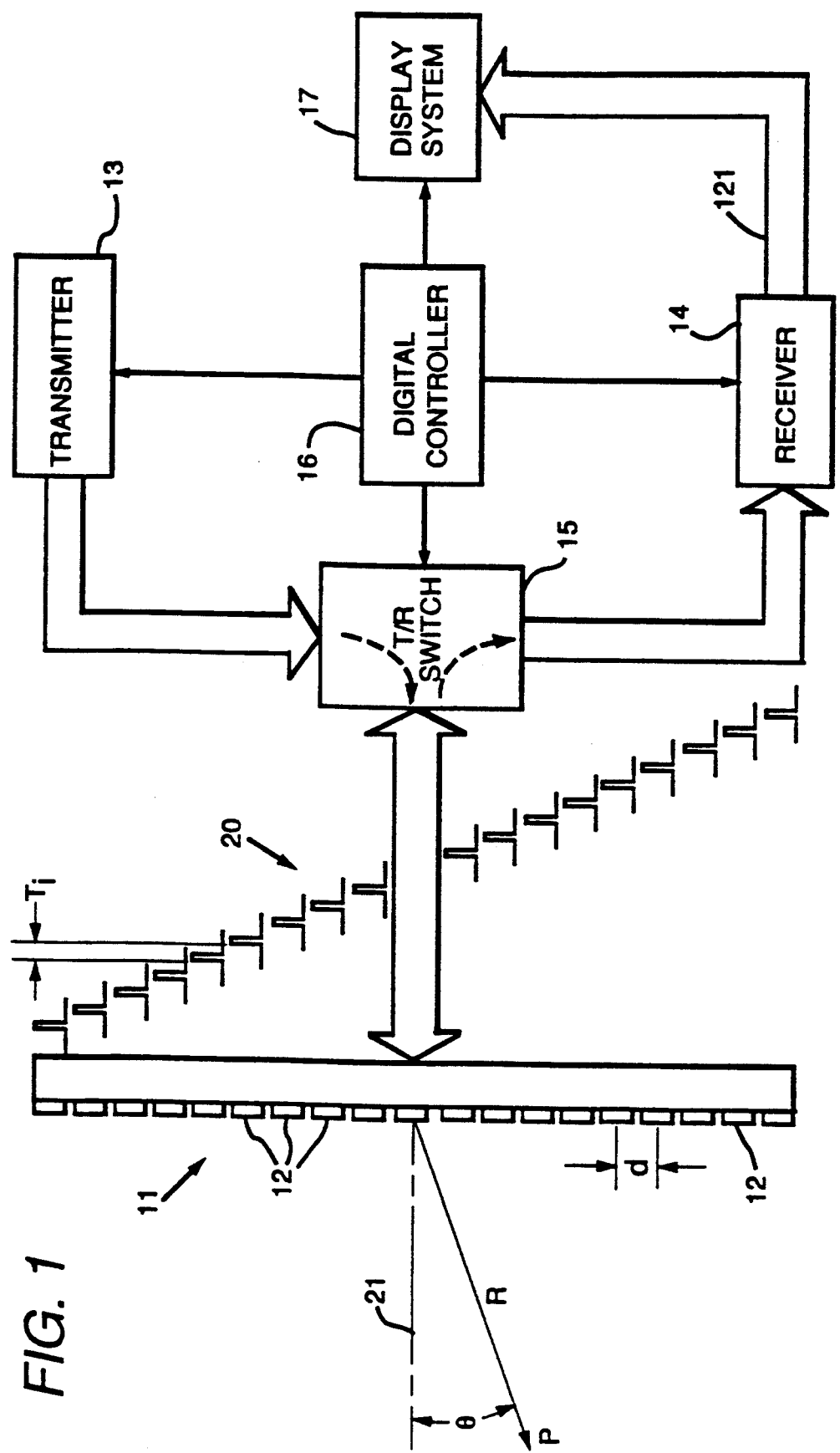
FIG. 1 is a block diagram of an ultrasonic imaging system which employs the present invention.

Referring particularly to FIG. 1, an ultrasonic imaging system includes a transducer array 11 comprised of a plurality of separately driven elements 12 which each produce a burst of ultrasonic energy when energized by a pulse produced by a transmitter 13. The ultrasonic energy reflected back to transducer array 11 from the subject under study is converted to an electrical signal by each transducer element 12 and applied separately to a receiver 14 through a set of switches 15. Transmitter 13, receiver 14 and switches 15 are operated under control of a digital controller 16 responsive to commands by a human operator. A complete scan is performed by acquiring a series of echoes in which transmitter 13 is gated on momentarily to energize each transducer element 12, switches 15 are then gated on to receive the subsequent echo signals produced by each transducer element 12, and these separate echo signals are combined in receiver 14 to produce a single echo signal which is employed to produce a pixel or a line in an image on a display 17.

Transmitter 13 drives transducer array 11 such that the ultrasonic energy produced is directed, or steered, in a beam. A B-scan can therefore be performed by moving this beam from point-to-point rather than physically moving transducer array 11. To accomplish this, transmitter 13 imparts a time delay ($T_i$) to the respective pulses 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased, as illustrated in FIG. 1, the ultrasonic beam is directed downward from central axis 21 by an amount $\theta$. The relationship between the time delay increment $T_i$ added successively to each $i^{th}$ signal from one end of the transducer array ($i=1$) to the other end ($i=n$) is given by the following relationship:

$$T_i = -(i-(n-1)/2)d \sin\theta/c + (i-(n-1)/2)^2 d^2 \cos^2\theta/2R_Tc + T_0 \quad (1)$$

where $d$ = equal spacing between centers of adjacent transducer elements 12, $c$ = the velocity of sound in the object under study.

$R_T$ = range at which transmit beam is to be focused.

$T_0$ = delay offset which insures that all calculated values ($T_i$) are positive values.

The first term in this expression steers the beam in the desired angle $\theta$, and the second is employed when the transmitted beam is to be focused at a fixed range. A sector scan is performed by progressively changing time delays $T_i$ in successive excitation. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to differences in the propagation paths between the focal point P and each transducer element 12, however, these echo signals will not occur simultaneously and their amplitudes will not be equal. The function of receiver 14 is to amplify and demodulate these separate echo signals, impart the proper time delay to each and sum them together to provide a single echo signal which accurately indicates the ultrasonic energy reflected from the focal point P located at range R along the ultrasonic beam oriented at the angle $\theta$. As will be described in more detail below, one aspect of the present invention involves summation of the echo signals such that a plurality of receive beams are formed and focused to each side of the main receive beam. This allows echo signals to be sampled simultaneously from a set of angles around the central angle $\theta$.

To simultaneously sum the electrical signals produced by the echoes from the focal point P, time delays are introduced into each separate transducer element channel of the receiver. In the case of linear array 11, the delay introduced in each channel may be divided into two components, one component referred to as a beam steering time delay, and the other component referred to as a beam focusing time delay. The beam steering and beam focusing time delays for reception are precisely the same delays ($T_i$) as the transmission delays described above. However, the focusing time delay component introduced into each receiver channel is continuously changing during reception of the echo to provide dynamic focusing of the received beam at the range R from which the echo signal emanates. This dynamic focusing delay component is as follows:

$$T_k = (k-(n-1)/2)^2 d^2 \cos^2\theta/2Rc \quad (2)$$

R = range of the focal point P from the center of array 11;

C = velocity of sound in the object under study; and $T_k$ = time delay associated with the echo signal from the $k^{th}$ element to coherently sum it with the other echo signals.

Under direction of digital controller 16, receiver 14 provides delays during the scan such that steering of receiver 14 tracks with the direction of the beam steered by transmitter 13 and it samples the echo signals at a succession of ranges and provides the proper delays to dynamically focus at points P along the beam. Thus, each emission of an ultrasonic pulse results in acquisition of a series of data points which represent the amount of reflected sound from a corresponding series of points P located along the ultrasonic beam. In the preferred embodiment, three receive beams are formed from each echo signal and three sets of echo signal samples are acquired and processed to produce a single series of velocity values.

Display system 17 receives the series of velocity values produced by receiver 14 and converts the data to a form producing the desired B-scan image. Each velocity data point in the series is used to control both brightness and color of a pixel in the image, and a scan comprised of a series of measurements at successive steering angles ($\theta$) is performed to provide the data necessary for display.

Figure 10:
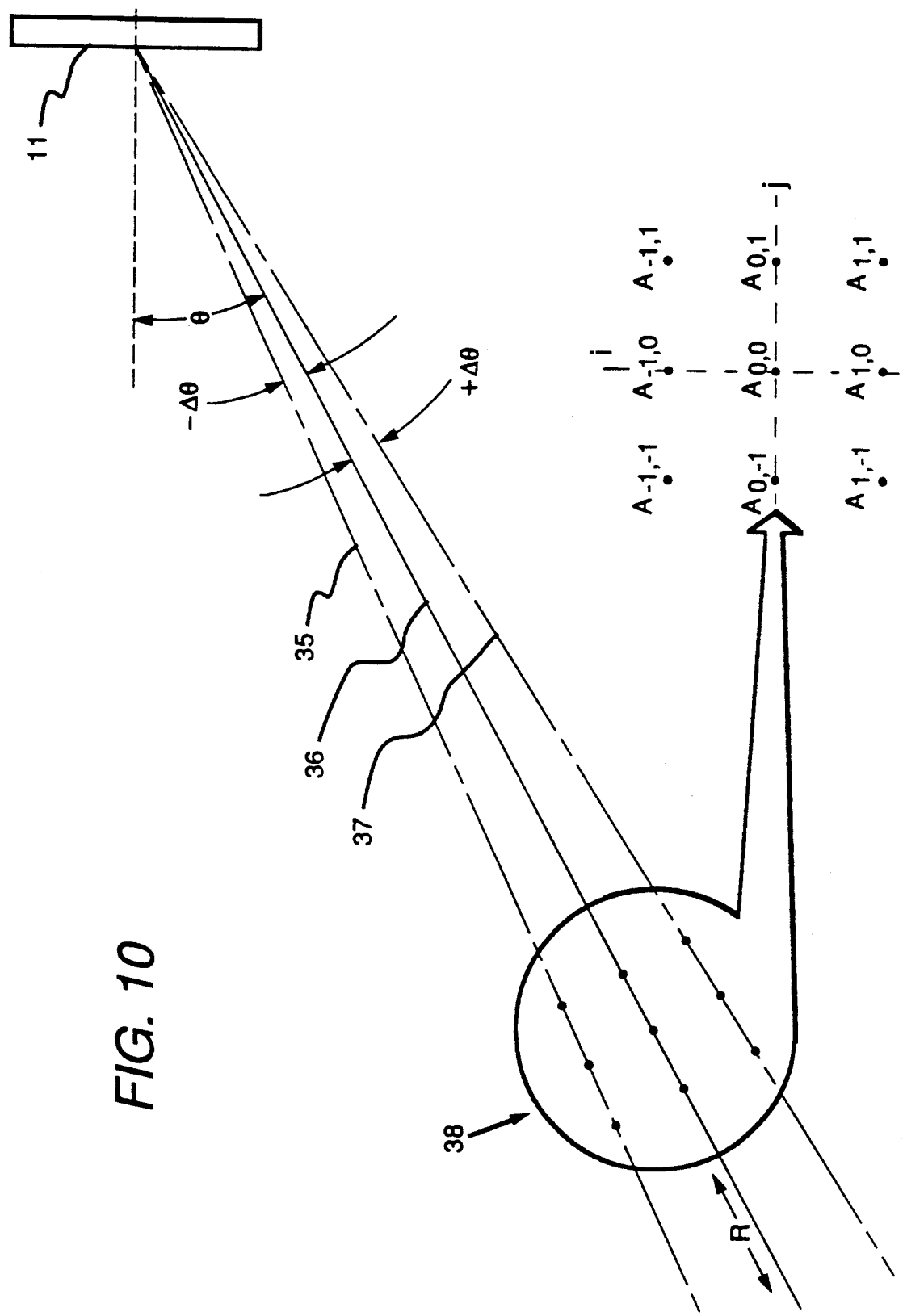
FIG. 10 is a schematic representation of a set of three receive beams employed by the vector flow processor of FIG. 6.

The three receive beams formed by receiver 14 at each beam angle ($\theta$) are shown in FIG. 10 as beams 35, 36 and 37. All three beams 35, 36 and 37 are sampled at a series of ranges (R). For each range sample along the center beam, a 3 by 3 patch of samples indicated at 38 is used for flow analysis. The center sample in this 3 by 3 patch is represented as $S^n(i,j)$, where i is the range index, j is the beam direction index and n is the number of the repeat measurement at a time interval $\Delta T$. A two-dimensional set of correlation functions from one measurement to the next is computed over this 3 by 3 patch 38 to detect the motion of reflectors from cell (i, j). These correlation functions are defined as follows:

$$A(-1, -1) = \sum_{n=2}^{N} S^n(i,j)[S^{n-1}(i-1, j-1)]^* e^{-iw0\Delta t}, \quad (1)$$

$$A(-1, 0) = \sum_{n=2}^{N} S^n(i,j)[S^{n-1}(i-1, j)]^* e^{-iw0\Delta t}, \quad (2)$$

$$A(-1, 1) = \sum_{n=2}^{N} S^n(i,j)[S^{n-1}(i-1, j+1)]^* e^{-iw0\Delta t}, \quad (3)$$

$$A(0, -1) = \sum_{n=2}^{N} S^n(i,j)[S^{n-1}(i, j-1)]^*, \quad (4)$$

$$A(0, 0) = \sum_{n=2}^{N} S^n(i,j)[S^{n-1}(i,j)]^*, \quad (5)$$

$$A(0, 1) = \sum_{n=2}^{N} S^n(i,j)[S^{n-1}(i, j+1)]^*, \quad (6)$$

$$A(1, -1) = \sum_{n=2}^{N} S^n(i,j)[S^{n-1}(i+1, j-1)]^* e^{iw0\Delta t}, \quad (7)$$

$$A(1, 0) = \sum_{n=2}^{N} S^n(i,j)[S^{n-1}(i+1, j)]^* e^{iw0\Delta t}, \quad (8)$$

$$A(1, 1) = \sum_{n=2}^{N} S^n(i,j)[S^{n-1}(i+1, j+1)]^* e^{iw0\Delta t}, \quad (9)$$

The peak of the two-dimensional correlation function determines the average displacement of the reflectors at position i,j from one firing (i.e. measurement) to the next. The peak, and hence the displacement, can be accurately estimated from the sampled correlation function. The basis of the method is to find the displacement which simultaneously satisfies the following conditions:

$$\frac{d|A(x, y)|}{dx}\bigg|_{y=constant} = 0, \quad (10)$$

$$\frac{d|A(x, y)|}{dy}\bigg|_{x=constant} = 0,$$

To find the displacement $(i_0, j_0)$ at which the correlation is maximal, both equations are expanded in a two-dimensional Taylor series about a point (x=i, y=j), where terms greater than first order in either the x or y directions are ignored. This results in a set of simultaneous linear equations $$-C_x = B_{xx} i_0 + B_{xy} j_0, \quad (11)$$

$$-C_y = B_{xy} i_0 + B_{yy} j_0,$$

$$B_{xx} = \frac{d^2|A(x, y)|}{dx^2}\bigg|_{x=i, y=j}, \quad (12)$$

$$B_{yy} = \frac{d^2|A(x, y)|}{dy^2}\bigg|_{x=i, y=j},$$

$$B_{xy} = \frac{d^2|A(x, y)|}{dxdy}\bigg|_{x=i, y=j},$$

$$C_x = \frac{d|A(x, y)|}{dx}\bigg|_{x=i, y=j},$$

$$C_x = \frac{d|A(x, y)|}{dy}\bigg|_{x=i, y=j}.$$

These equations can be easily solved to yield the displacement $(i_0, j_0)$ if the four terms of Eq. 12 can be calculated. Using a central difference approximation, the four terms of Eq. 12 are computed from the nine correlation equations [(1)–(9)]:

$$C_x = \frac{|A(0, 1)| - |A(0, -1)|}{2}, \quad (13)$$

$$C_y = \frac{|A(1, 0)| - |A(-1, 0)|}{2},$$

$$B_{xx} = |A(0, 1)| + |A(0, -1)| - 2|A(0, 0)|,$$

$$B_{yy} = |A(1, 0)| + |A(-1, 0)| - 2|A(0, 0)|,$$

$$B_{xy} = \frac{|A(1, 1)| + |A(-1, -1)| - |A(1, -1)| - |A(-1, 1)|}{4}.$$

Consequently, the nine sample points can be used to calculate the peak of the full 2-D cross correlation function. From this, the two components of the mean velocity at the central sample of the 3 by 3 patch 38 are given by the expressions:

$$v_R(i,j) = (i_0 \cdot \Delta R)/\Delta T,$$

$$v_{\sin\theta}(i,j) = (j_0 \cdot \Delta(\sin\theta))/\Delta T,$$

where $\Delta T$ is the period between firings, $\Delta R$ is the spacing between range samples, and $\Delta(\sin\theta)$ is the spacing between beam samples. The magnitude and direction of flow at every pixel can be obtained from these equations according to the expressions:

$$r(i,j) = \sqrt{v_R^2(i,j) + v_{\sin\theta}^2(i,j)}, \quad (15)$$

$$\phi(i,j) = \tan^{-1}\left[\frac{v_{\sin\theta}(i,j)\cos\theta_j + v_R(i,j)\sin\theta_j}{v_R(i,j)\cos\theta_j - v_{\sin\theta}(i,j)\sin\theta_j}\right].$$

A true vector color flow image uses Eq. 15 to encode the color value at each pixel in the image. Although presented here in two dimensions, the method can be easily extended to three dimensions for three-dimensional phased array imaging systems.

To ensure good estimates using the method discussed above, the excitation system must do two things. First, the envelope of the excitation pulse must be well matched to the range sampling used to compute the nine correlation values. That is, the 3 dB width of the excitation envelope must equal the range sampling of the correlation computations. The second requirement on the excitation system is that the repetition interval (i.e., $\Delta T$ of Eq. 14) must be short enough to insure that red blood cells do not completely leave the 3 by 3 patch 38 from one firing to the next. Because the fractional bandwidth of an ultrasound imaging system is always less than 100%, this requirement is not as stringent as the anti-aliasing requirement of a conventional Doppler processor. However, there still is a requirement on the pulse repetition rate to insure that the approximations used in generating the velocity estimates are valid.

The values $v(R,\theta)$ are supplied to display system 17 of FIG. 1 and used to control intensity of the corresponding image pixel, and the values $\phi(R,\theta)$ are used to control the color of that pixel.

Figure 2:
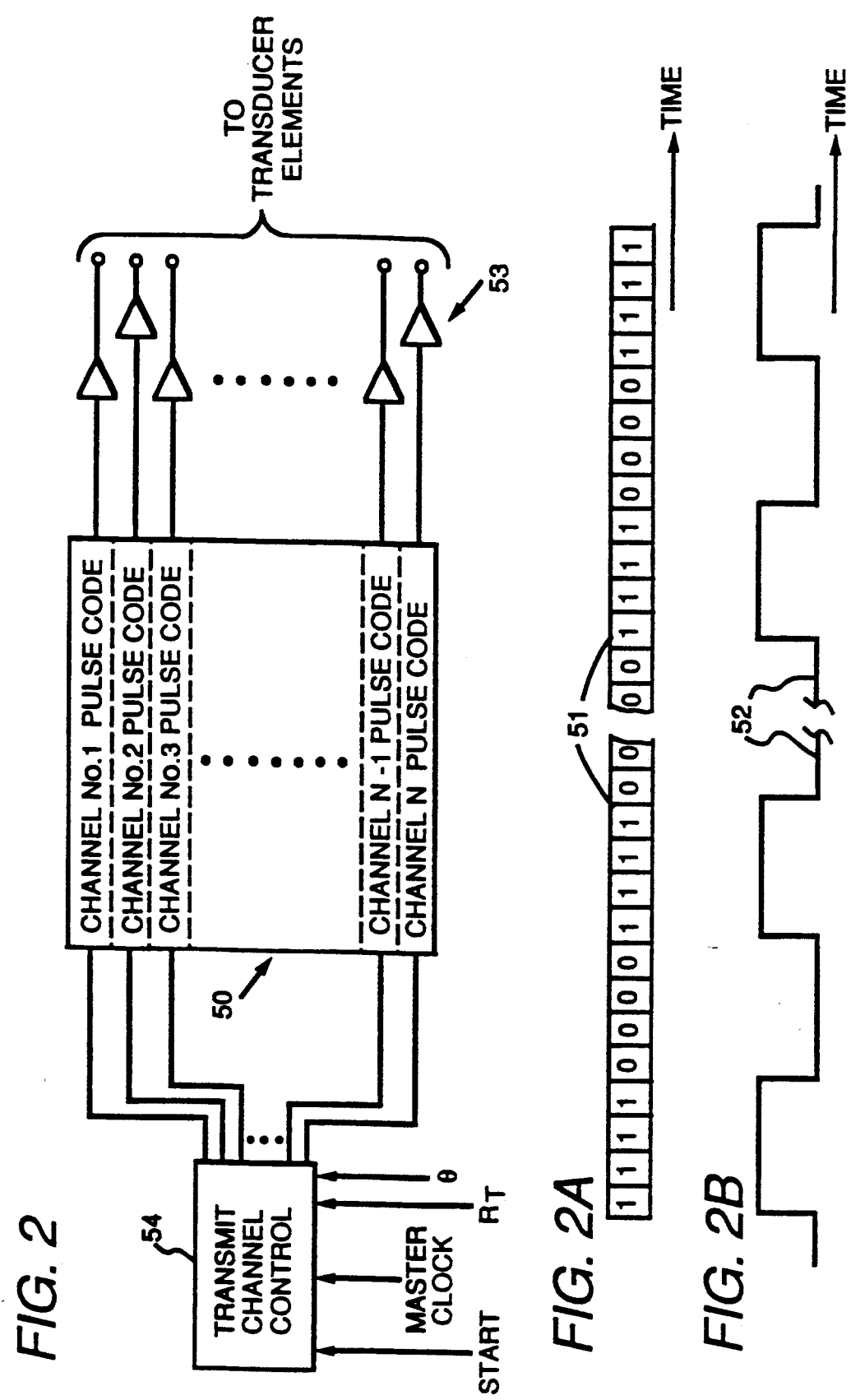
FIG. 2 is a block diagram of a transmitter which forms part of the system of FIG. 1.

Referring to FIG. 2 in conjunction with FIG. 1, transmitter 13 includes a set of channel pulse code memories indicated collectively as memories 50. In the preferred embodiment, there are 128 separate transducer elements 12, and therefore, there are 128 separate channel pulse code memories 50. Each pulse code memory 50 is typically a 1-bit by 512-bit memory which stores a bit pattern 51 that determines the frequency of ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2A, the bit pattern is a sequence of four "1" bits alternated with four "0" bits to produce a 5 MHz ultrasonic pulse 52. Transducer elements 12 to which these ultrasonic pulses 52 are applied respond by producing ultrasonic energy. If all 512 bits are used, then a pulse of bandwidth as narrow as 40 kHz centered on the carrier frequency (i.e. 5 MHz in the example) will be emitted.

As indicated above, to steer the transmitted beam of ultrasonic energy in the desired direction ($\theta$), pulses 52 for each of the N channels, such as shown in FIG. 2B, must be delayed by the proper amount. These delays are provided by a transmit control 54 which receives four control signals (START, MASTER CLOCK, $R_T$ and $\theta$) from digital controller 16 (FIG. 1). Using the input control signal $\theta$, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, one of four phases of the 40 MHz MASTER CLOCK signal is gated through to the next channel pulse code memory 50 until all N=128 channels are producing their ultrasonic pulses 52. Each transmit channel 50 is reset after its entire bit pattern 51 has been transmitted and transmitter 13 then waits for the next $\theta$ and next START control signals from digital controller 16. As indicated above, in the preferred embodiment of the invention a complete B-scan is comprised of 128 ultrasonic pulses steered in $\Delta\theta$ increments of 0.70 degrees through a 90 degree sector centered about the central axis 21 (FIG. 1) of the transducer 11.

For a detailed description of transmitter 13, reference is made to commonly assigned U.S. Pat. No. 5,014,712, issued Jan. 28, 1991 and entitled "Coded Excitation For Transmission Dynamic Focusing of Vibratory Energy Beam", incorporated herein by reference.

Figure 3:
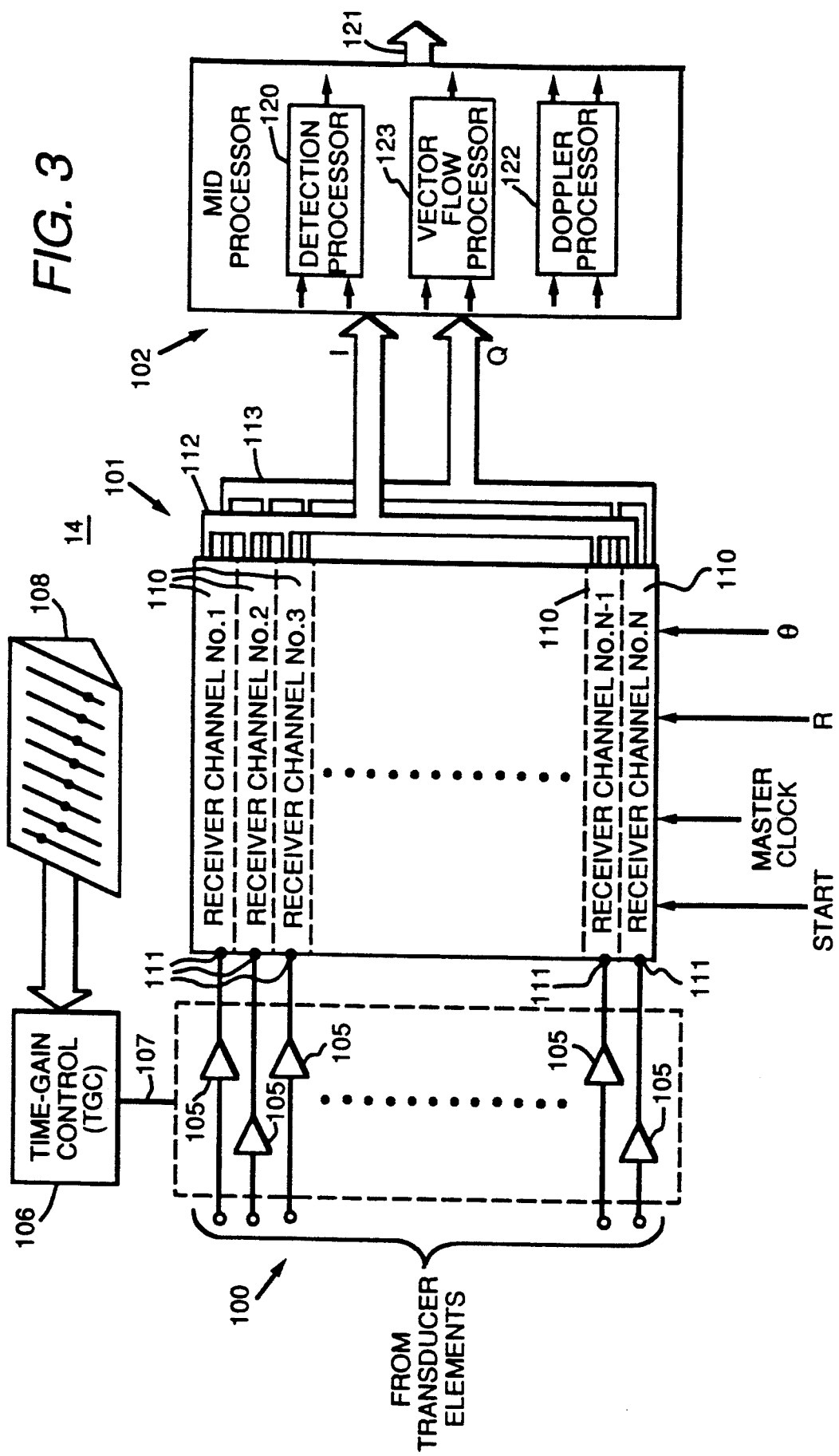
FIG. 3 is a block diagram of a receiver which forms part of the system of FIG. 1.

Referring particularly to FIG. 3 in conjunction with FIG. 1, receiver 14 is comprised of three sections: a time-gain control section 100, a beam forming section 101, and a mid processor 102. Time-gain control section 100 includes an amplifier 105 for each of the N=64 receiver channels and a time-gain control circuit 106. The input of each amplifier 105 is coupled to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gains of amplifiers 105 during each of the eight respective time intervals so that the echo signal is amplified in ever increasing amounts over the acquisition time interval.

The beam forming section 101 of receiver 14 includes N=128 separate receiver channels 110. As will be explained in more detail below, each receiver channel 110 receives the analog echo signal from one of TGC amplifiers 105 at an input 111, and it produces a stream of digitized output values on an I bus 112 and a Q bus 113. Each of these I and Q values represents a sample of the echo signal envelope at a specific range (R). These samples have been delayed in the manner described above such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at equal intervals of about 150 micrometers over the entire range of the scan line (typically 40 to 200 millimeters).

For a more detailed description of receiver 14, reference is made to U.S. Pat. No. 4,983,970 which issued on Jan. 8, 1991 and is entitled "Method And Apparatus for Digital Phase Array Imaging", and which is incorporated herein by reference.

Referring still to FIG. 3, the mid processor section 102 receives the beam samples from each receiver channel 110. The I and Q values of each beam sample are 16-bit digital numbers representing the in-phase and quadrature components of the magnitude of the reflected sound from a point ($R,\theta$). The mid processor 102 can perform a variety of calculations on these beam samples, where choice is determined by the type of image to be reconstructed. For example, if a conventional magnitude image is to be produced, a detection process occurring at a processor 120 is implemented in which the separate receiver channel output signals are summed to produce a single receive beam signal and a digital magnitude M is calculated from each summed beam signal sample and supplied at output 121 according to $$M = \sqrt{I^2 + Q^2}.$$

Detection processor 120 may also implement correction methods such as disclosed in U.S. Pat. No. 4,835,689, issued May 30, 1989 and entitled "Adaptive Coherent Energy Beam Formation Using Phase Conjugation." Such correction methods involve examining the receive beam signal samples and calculating corrective values that can be used in subsequent measurements by transmitter 13 and receiver 14 to improve beam focusing and steering. Such corrections are necessary, for example, to account for the non-homogeneity of the media through which the sound from each transducer element travels during a scan.

Mid processor 102 may also include a Doppler processor 122 such as that described in U.S. Pat. No. 4,217,909 issued Aug. 19, 1980 and entitled "Directional Detection of Blood Velocities In An Ultrasound System"; or in U.S. Pat. No. 4,265,126 issued on May 5, 1981 and entitled "Measurement of True Blood Velocity By an Ultrasound System." Such Doppler processors employ the phase information ($\phi$) contained in each beam sample to determine the velocity of reflecting objects along the direction of the beam (i.e. radial direction from the center of the transducer 11), where $$\phi = \tan^{-1}(Q/I).$$

The present invention is implemented in large part by a vector flow processor 123 contained in mid processor 102 and which will be described in detail below. Vector flow processor 123 sums the separate I and Q samples from each receiver channel 110 such that three receive beam signals are formed and sampled at a series of ranges R. Vector flow processor 123 also calculates a series of velocity numbers v(R,$\theta$) and direction numbers $\phi$(R,$\theta$) indicative of the flow of reflectors at the series of sample ranges R along the beam ($\theta$). These numbers are supplied to display system 17 to produce an image as described above.

Figure 4:
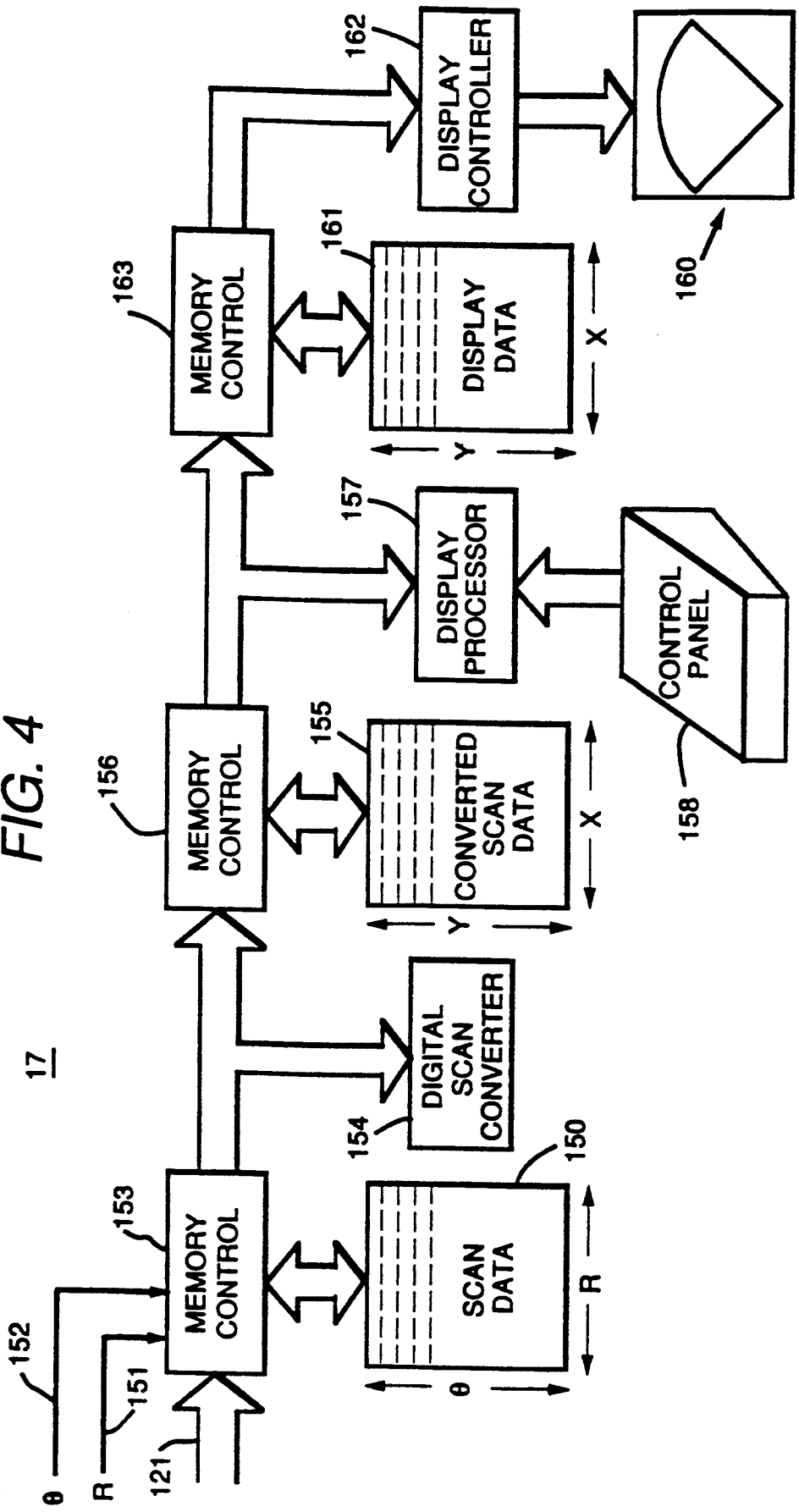
FIG. 4 is a block diagram of a display system which forms part of the system of FIG. 1.

Referring particularly to FIGS. 1 and 4, receiver 14 generates a stream of 8-bit digital numbers at its output 121 which is applied to the input of display system 17. These "scan data" are stored in a memory 150 as an array, with the rows of the scan data array 150 corresponding with the respective beam angles ($\theta$) that are acquired, and the columns of the scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update the scan data array 150.

Referring still to FIG. 4, the scan data in array 150, consisting of both flow velocity and flow direction information, are read by a digital scan converter 154 and converted to a form producing the desired image. A color B-scan image is produced from the velocity values V(R,$\theta$) and direction values $\phi$(R,$\theta$) stored in scan data array 150 by converting them to velocity values V(x,y) and direction values $\phi$(x,y) at Cartesian pixel locations. Such a polar coordinate to Cartesian coordinate conversion of the ultrasonic image data is described, for example, in an article by Steven C. Leavitt et al. in *Hewlett-Packard Journal*, October, 1983, pp. 30–33, entitled "A Scan Conversion Algorithm for Displaying Ultrasound Images."

The resulting color image data are written to a memory 155 which stores a two-dimensional array of converted luminance and chrominance scan data. In the preferred embodiment, the luminance is determined by flow velocity and the chrominance is determined by flow direction. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data 155. For example, the range of brightness levels indicated by converted scan data 155 may far exceed the brightness range of display device 160. Indeed, the brightness resolution of converted scan data 155 may far exceed the brightness resolution of the human eye, and manually operable controls are typically provided which enable the operator to select a window of brightness values over which maximum image contrast is to be achieved. The display processor reads the converted luminance and chrominance scan data from memory 155, computes independent RGB (Red, Green, Blue) numbers appropriate for the color CRT display, and writes these color values to a display memory 161.

Display memory 161 is shared with a display controller circuit 162 through a memory control circuit 163, and the color values therein are mapped to control brightness and color of the corresponding pixels in display 160. Display controller 162 is a commercially available integrated circuit designed to operate the particular type of display 160 used. For example, display 160 may be a color cathode ray tube or CRT, in which case the display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
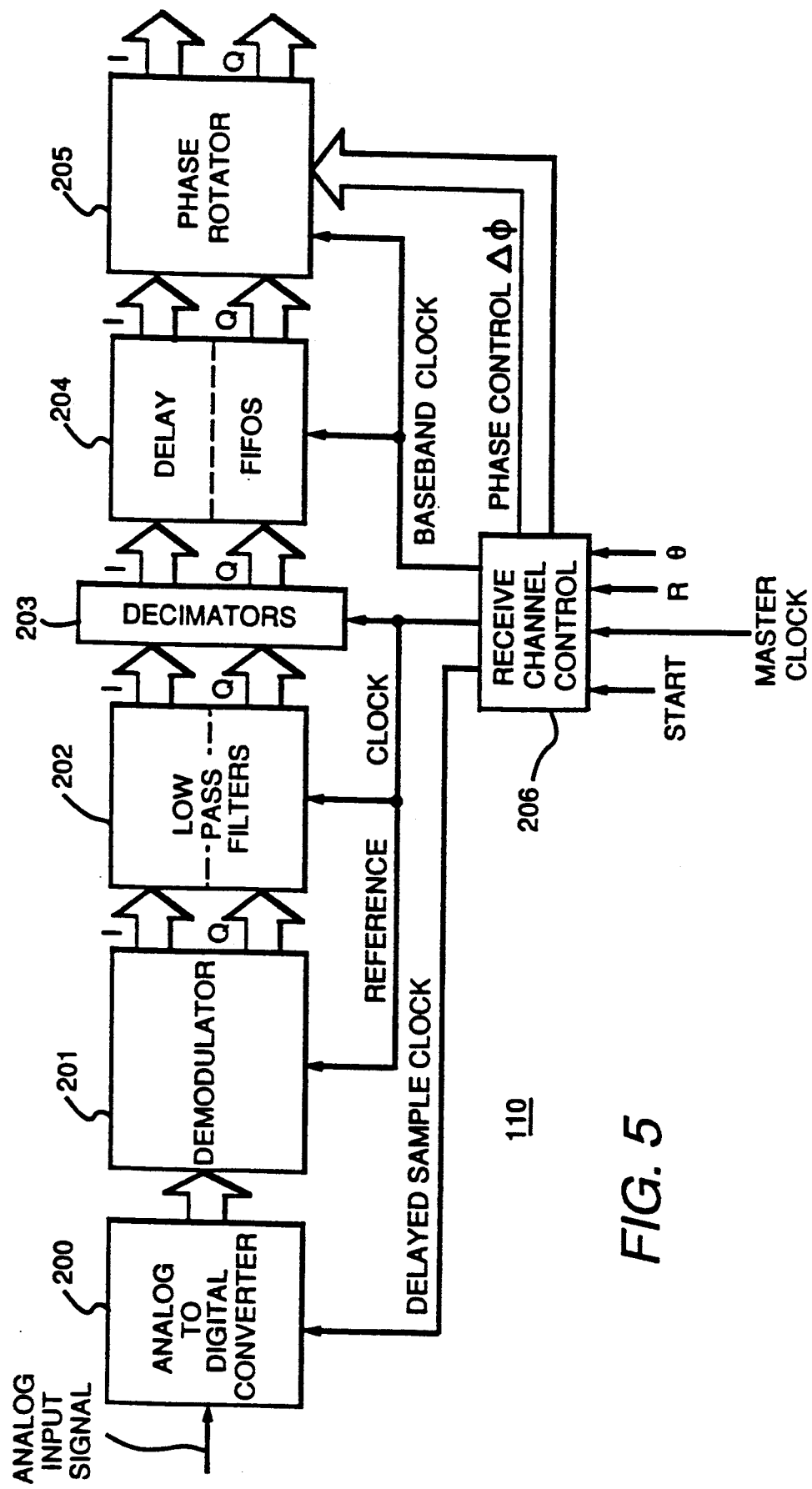
FIG. 5 is a block diagram of a receiver channel which forms part of the receiver of FIG. 3.

As indicated above with reference to FIG. 3, the beam forming section 101 of receiver 14 is comprised of a set of receiver channels 110—one for each element 12 of transducer 11 (FIG. 1). Referring particularly to FIG. 5, each receiver channel is responsive to a START command, a 40 MHz master clock, a range signal (R) and a beam angle signal ($\theta$) from digital controller 16 (FIG. 1) to perform the digital beam forming functions. These include: sampling the analog input signal in an analog-to-digital converter 200, demodulating the sampled signal in a demodulator 201; filtering out the high frequency sum signals produced by demodulator 201 with low pass filters 202; reducing the data rate in decimators 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to commands from digital controller 16 (FIG. 1). In the preferred embodiment, all of these elements are contained on a single integrated circuit.

Figure 5E:
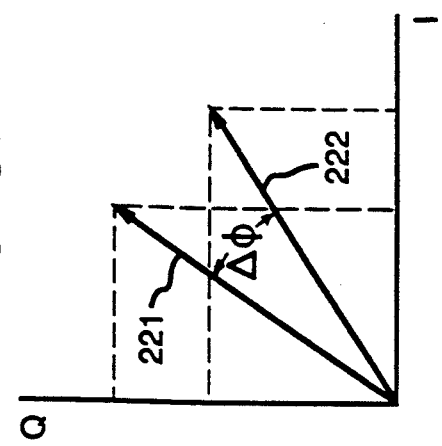
Figure 5B:
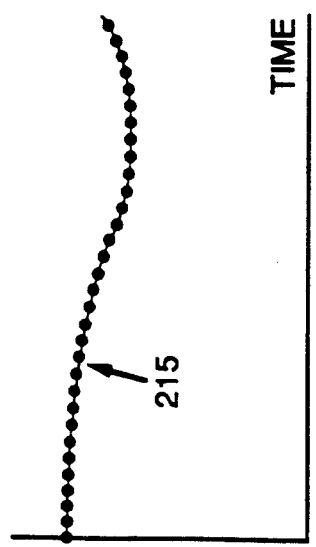
Figure 5D:
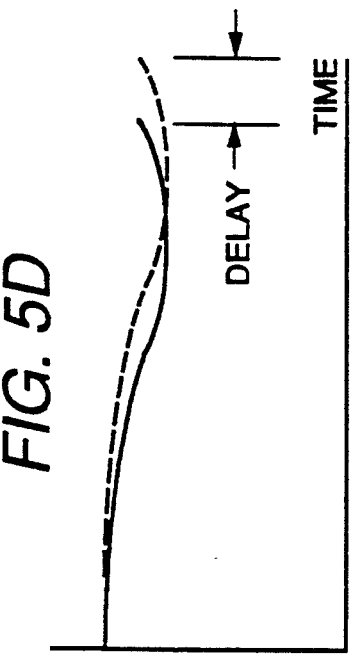
Figure 5A:
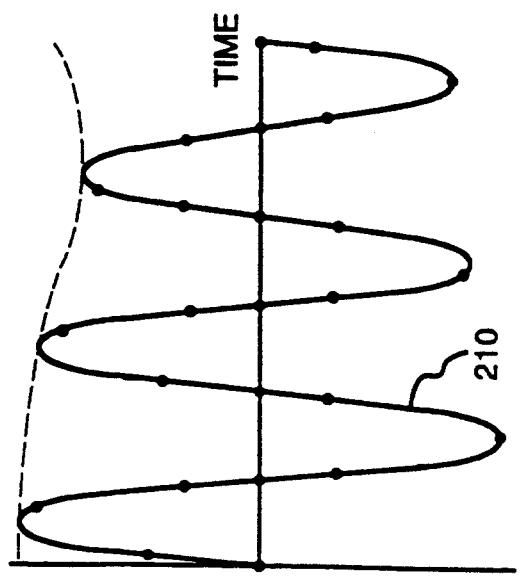

Referring still to FIG. 5, analog-to-digital converter 200 samples the analog input signal, indicated graphically by waveform 210 in FIG. 5A, at regular intervals determined by the leading edge of a delayed sample clock signal from receive channel control 206. In the preferred embodiment the sample clock signal is a 40 MHz clock signal to enable use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are supplied to demodulator 201 which mixes each sample with both a reference in-phase with the transmitted ultrasonic carrier, and with a reference in quadrature with the transmitted ultrasonic carrier. The demodulator reference signals are produced from stored SINE and COSINE tables that are read out of their respective ROM memories by a 40 MHz reference clock signal from receive channel control signal 206. The SINE value is digitally multiplied by the sampled input signal to produce a demodulated, in-phase value (I) supplied to low pass filter 202, and the COSINE value is digitally multiplied by the same sampled input signal to produce a demodulated, quadrature phase value Q signal supplied to a separate low pass filter 202. The low pass filters 202 are finite impulse response filters tuned to pass the difference frequencies supplied by demodulator 201, but block the higher, sum frequencies. As shown by waveform 215 in the graph of FIG. 5B, the output signal of each low pass filter is, therefore, a 40 MHz stream of digital values which indicate the magnitude of the I or Q component of the echo signal envelope.

For a detailed description of an analog-to-digital converter, demodulator, and a low pass filter circuit reference is made to commonly assigned U.S. Pat. No. 4,839,652 which issued Jun. 13, 1989 and is entitled "Method and Apparatus For High Speed Digital Phased Array Coherent Imaging System".

Figure 5C:
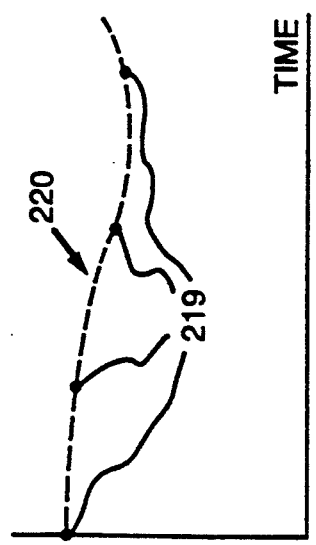

Referring still to FIG. 5, the rate at which the demodulated I and Q components of the echo signal are sampled is reduced by decimators 203. The 12-bit digital samples are supplied to the decimators at a 40 MHz rate which is unnecessarily high from an accuracy standpoint, and which is a difficult data rate to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. The I and Q output signals of decimators 203 are thus digitized samples 219 of the echo signal envelope indicated by dashed line 220 in the graph of FIG. 5C. The decimation ratio and the baseband clock frequency can be changed to values other than 8:1 and 5 MHz.

The echo signal envelope represented by the demodulated and decimated digital samples is then delayed by delay FIFOs 204 and phase rotator 205 to provide the desired beam steering and beam focusing. These delays are in addition to the coarse delays provided by the timing of the delayed sample clock signal which is applied to analog-to-digital converter 200 as described above. That is, the total delay provided by receiver channel 110 is the sum of the delays provided by the delayed sample clock signal supplied to analog-to-digital converter 200, the delay FIFOs 204 and the phase rotator 205. The delay FIFOs 204 are memory devices into which the successive digital sample values are written as they are produced by decimators 203 at a rate of 5 MHz. These stored values are written into successive memory addresses and then read from the memory device and supplied to phase rotator 205. The amount of delay, illustrated graphically in FIG. 5D, is determined by the difference between the memory location from which the digital sample is currently being supplied and the memory location into which the currently received digital sample is being stored. The 5 MHz baseband clock signal establishes 200 nanosecond intervals between stored digital samples and FIFOs 204 can, therefore, provide a time delay measured in 200 nanosecond increments up to their maximum of 25.6 microseconds.

Phase rotators 205 enable the digitized representation of the echo signal to be delayed by amounts less than the 200 nanosecond resolution of delay FIFOs 204. The I and Q digital samples supplied to phase rotator 205 may be represented, as shown in FIG. 5E, by a phasor 221 and the rotated I and Q digital samples produced by phase rotator 205 may be represented by a phasor 222. The magnitudes of the phasors (i.e. the vector sum of the I and Q components of each) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received on a bus from receive channel control 206. For a detailed description of the phase rotator 205, reference is made to commonly assigned U.S. Pat. No. 4,896,287 which issued on Jan. 23, 1990 and is entitled "Cordic Complex Multiplier" and is incorporated herein by reference.

Figure 6:
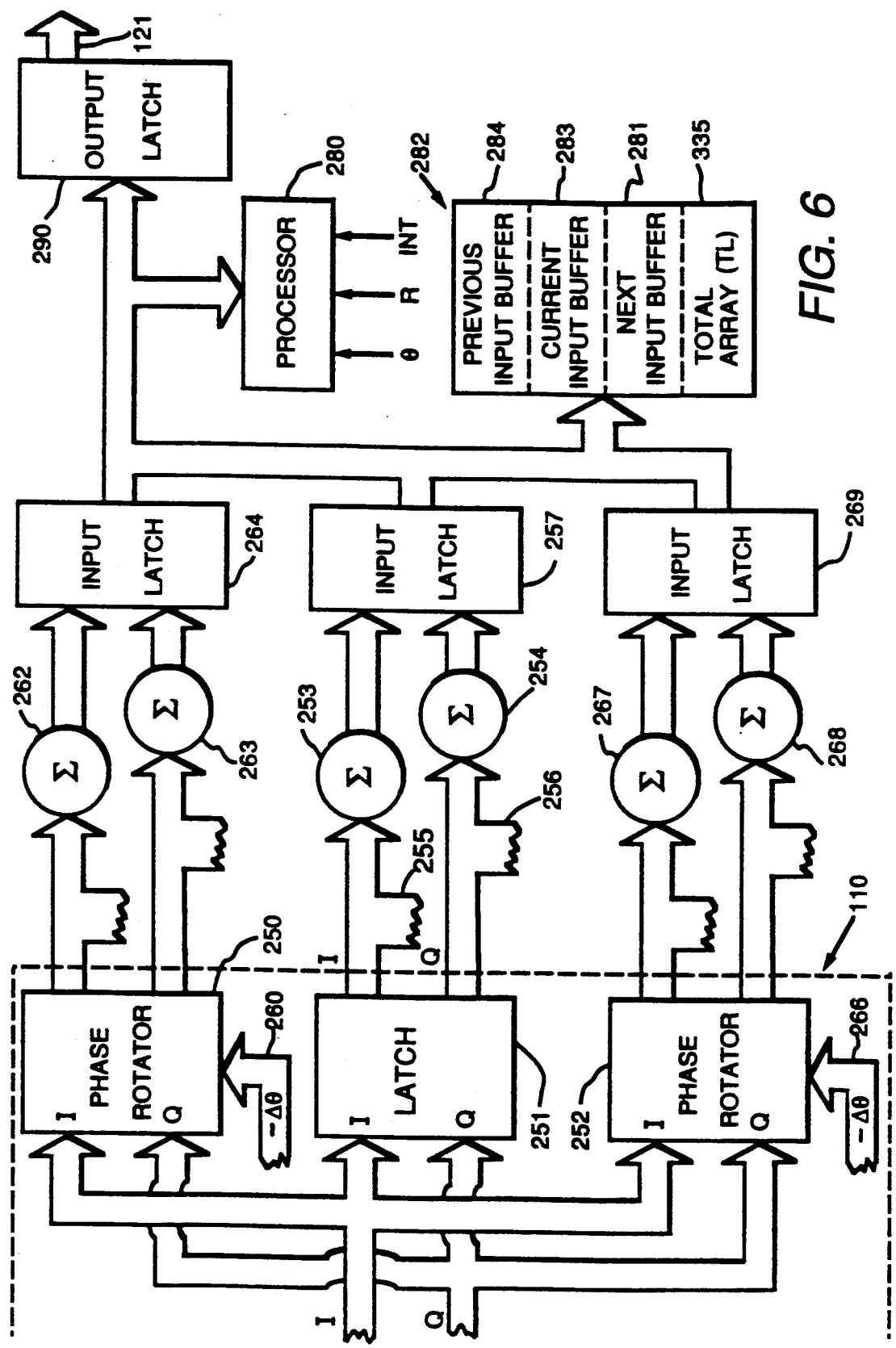
FIG. 6 is an electrical block diagram of a vector flow processor which forms part of the receiver of FIG. 3.

In the system of FIG. 6, the I and Q output signal of each channel receiver 110 is supplied to vector flow processor 123 in mid processor 102 (shown in FIG. 1) and applied to corresponding inputs on a phase rotator 250, a latch 251 and a second phase rotator 252. Elements 250-252 may be viewed as part of each channel receiver 110. Latch 251 simply passes on the stream of digitized receiver channel I and Q samples which represent the focused receive beam steered in the direction $\theta$. These I and Q samples are summed at respective summing points 253 and 254 with the corresponding I and Q latch output signals from each of the other receiver 110 channels which appear on respective buses 255 and 256. For a detailed description of how the I and Q latch outputs are summed together to form a beam signal, reference is made to U.S. Pat. No. 4,983,970 which issued on Jan. 8, 1991 and is entitled "Method And Apparatus For Digital Phase Array Imaging" and is incorporated herein by reference. The summed I and Q latch output signals represent a mid receive beam dynamically focused at range R and steered to angle $\theta$.

This mid beam is sampled at a 5 MHz rate and the samples are sequentially clocked into an input latch 257.

Two additional receive beam signals are formed by phase rotators 250 and 252 and their associated circuitry. Phase rotator 250 is identical to phase rotator 205 (FIG. 5) described above and receives a $+\Delta\theta$ command on bus 260 which causes it to rotate the phasor represented by the receiver channel I and Q values. As explained in U.S. Pat. No. 4,886,069 which issued on Dec. 12, 1989 and is entitled "Method Of, And Apparatus For, Obtaining A Plurality of Different Return Energy Imaging Beams Responsive To A Single Excitation Event," this phase rotation followed by summation of all $+\Delta\theta$ rotated I and Q output signals at respective summing points 262 and 263 produces a signal representing a second receive beam which is steered $+\Delta\theta$ degrees from the mid beam. The stream of $+\Delta\theta$ beam samples are applied to an input latch 264 at the 5 MHz clock rate.

Phase rotator 252 receives a $-\Delta\theta$ command on bus 266 and rotates the phasor represented by the mid beam I and Q samples in the opposite direction from $+\Delta\theta$ phase rotator 250. The $-\Delta\theta$ I and Q samples from each of the receive channels 110 are summed at summing points 267 and 268 to form a signal representing a third $(-\Delta\theta)$ receive beam as described in the above cited U.S. Pat. No. 4,886,069. The streaming I and Q samples of this third receive beam signal are clocked into an input latch 269 at the 5 MHz clock rate.

Referring to FIGS. 6 and 10, receiver 14 (FIG. 1) thus produces signals representing a set of three receive beams 35, 36 and 37, dynamically focused at a series of sample ranges R and disposed around the mid beam 36 at the beam angle ($\theta$). The input latches 269, 257 and 264 simultaneously receive the I and Q samples of these respective beams 35-37 as the ultrasonic echo is received by transducer array 11 (FIG. 1). After the samples are acquired for all ranges R, additional ultrasonic pulses are transmitted and additional receive beams acquired at the same beam angle ($\theta$) in order to improve the signal-to-noise ratio of the measured samples. In the preferred embodiment, four to sixteen repeats are performed at each mid beam angle ($\theta$) before the scan is advanced by 0.70° to the next beam angle. The scan is completed when data for all 128 beam angles, or a subset of these beams, has been acquired.

Referring particularly to FIG. 6, when each set of beam samples is available in input latches 257, 264 and 269, a processor 280 is interrupted and executes a routine which advances the three beam samples into a NEXT input buffer 281 in a random access memory 282. The NEXT input buffer is organized as a two-dimensional data array in which the three beam samples are stored in respective columns of the array and each row of samples corresponds with the sample range (R). As will be explained in detail below, processor 280 executes a program which calculates the flow values at the sample ranges (R) along the mid beam ($\theta$). These calculations are performed on data previously acquired and stored in a current input buffer 283 and a previous input buffer 284. Buffers 283 and 284 store two-dimensional arrays identical to that described above, but they store the acquired set of sample data for the two previous firings of the transmitter 13. The contents of buffers 283 and 284 are shown pictorially in FIG. 9. As will be described in detail, processor 280 operates on data arrays 283 and 284 to calculate velocity values and direction values which are supplied to a latch 290. This series of output values is applied to display system 17 (FIG. 1) along with the beam angle ($\theta$) and range (R) associated with them as described above.

Figure 7:
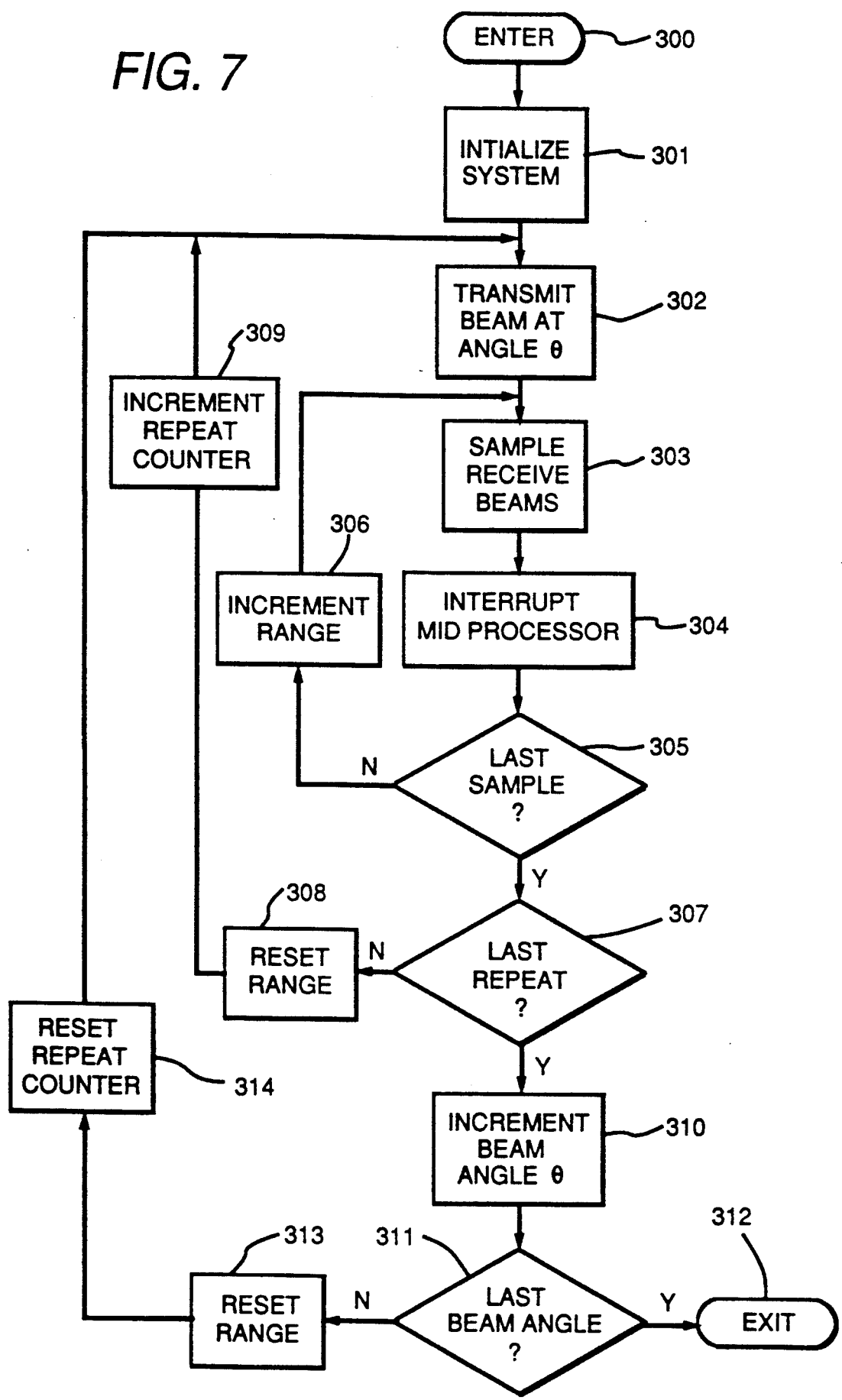
FIG. 7 is a flow chart of a program executed by the digital controller of FIG. 1 to carry out the preferred embodiment of the invention.

To carry out a scan in accordance with the present invention, digital controller 16 (FIG. 1) executes a program illustrated in FIG. 7. This program is entered at 300 and it executes a set of instructions indicated by process step 301 to initialize data structures such as a range counter, beam angle counter and a repeat counter. A loop is then entered at process step 302 in which transmitter 13 (FIG. 1) is fired to produce an ultrasonic beam steered in the direction $\theta$. An interval timer $\Delta T$ is set so that the next firing occurs at a precise interval after the current firing, and the system then begins to acquire samples from the received echo signal.

As the echo signal is received after each firing of transmitter 13 (FIG. 1), receiver 14 (FIG. 1) is enabled at each sample range (R) as indicated at process step 303, and the three receive beam samples ($+\Delta\theta, \theta, -\Delta\theta$) are produced as described above. An interrupt of mid processor 280 (FIG. 6) is then generated at step 304 to indicate to it that the beam samples are available, and a check is made at decision step 305 to determine if the last beam sample has been acquired for this firing of the transmitter. If not, the range counter (R) is incremented at process step 306 and the system loops back to acquire an additional sample of the three receive beams.

After the entire echo signal has been sampled, a check is made at decision point 307 to determine if a further firing at the same beam angle ($\theta$) is to be made. In the preferred embodiment at least four and up to sixteen firings may occur at each beam angle ($\theta$) in order to average the calculated velocity values as will be described below. If further firings are to occur, the system loops back and the range counter (R) is reset at step 308 and the repeat counter is incremented at process step 309.

When the desired number of repeat firings has occurred, as determined at decision point 307, the beam angle counter ($\theta$) is incremented at process step 310 to steer the transmitter and receiver to the next beam angle in the scan. If the last beam angle has been acquired as determined at decision point 311, the scan is complete and the program exits at 312. Otherwise, the system loops back to acquire the next beam angle after resetting the range counter (R) at step 313 and the repeat counter at step 314.

Figure 8:
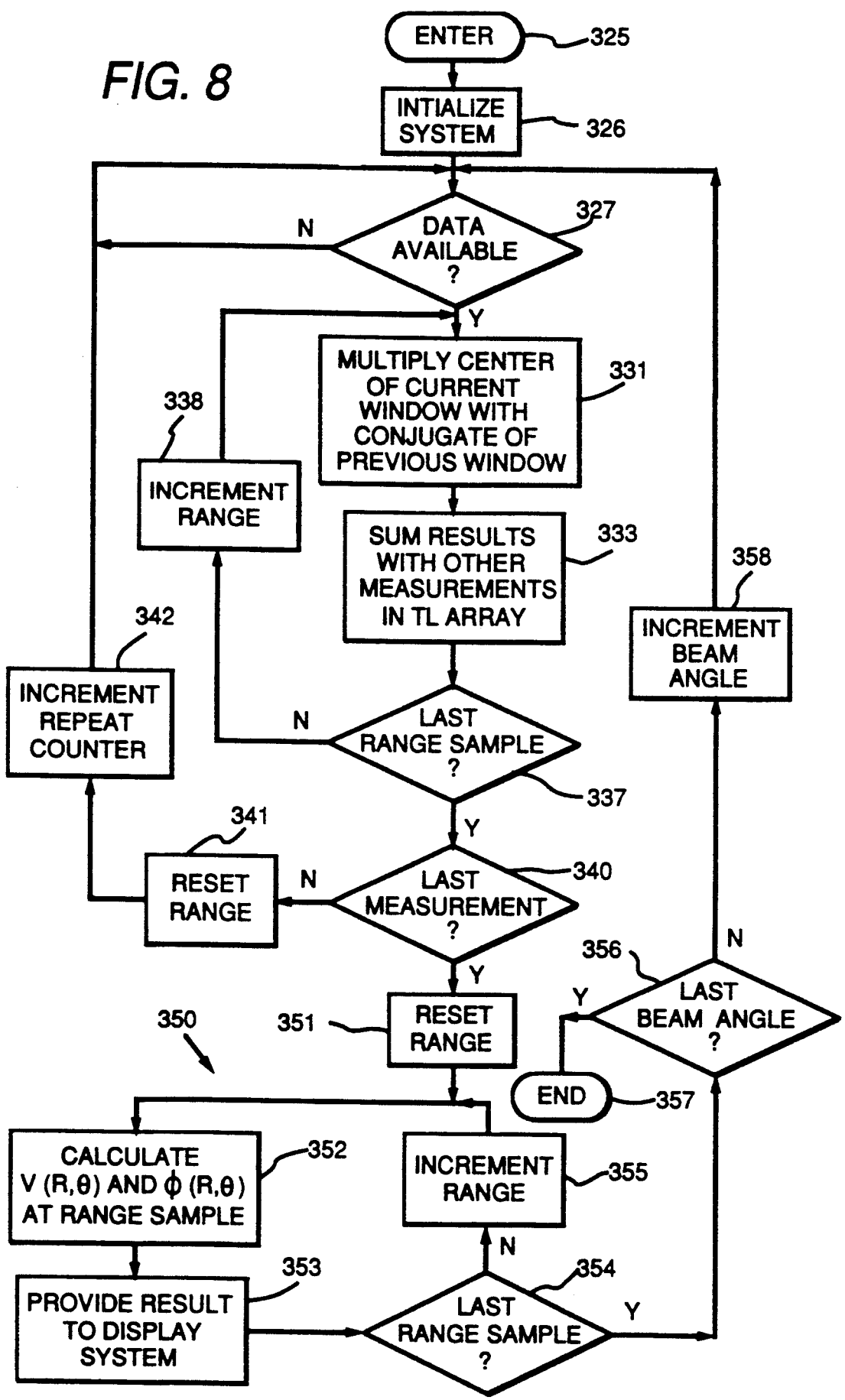
FIG. 8 is a flow chart of a program executed by the vector flow processor of FIG. 6 to carry out the preferred embodiment of the invention.

While beam samples are being acquired, mid processor 280 (FIG. 6) is executing the program shown in FIG. 8 to calculate velocity values from previously acquired beam samples. This program is entered at 325 and a set of instructions are executed at process step 326 to initialize data structures such as a range counter, a beam angle counter, a repeat counter, and a total (TL) array. A loop is then entered at decision point 327 in which the mid processor waits for sufficient data to be acquired. As indicated above with reference to FIG. 6, during each interrupt of processor 280 further beam sample data are loaded into NEXT input buffer 281 and, when the buffer is filled, a pointer is changed so that it becomes current input buffer 283, the current input buffer becomes previous input buffer 284, and the previous input buffer becomes NEXT input buffer 281. Sufficient data are available for mid processor 280 when current input buffer 283 and previous input buffer 284 contain fresh beam sample data.

Figure 9:
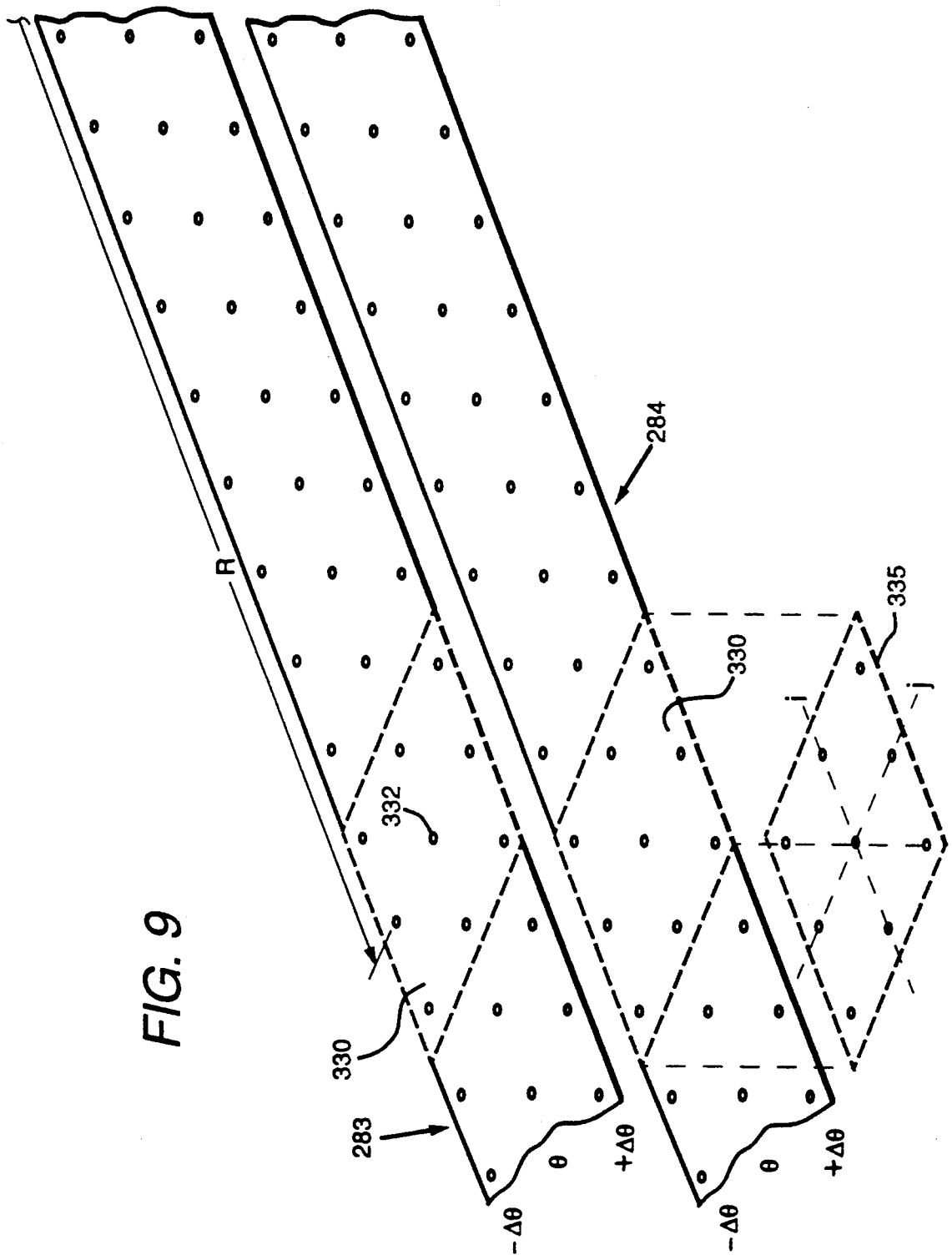
FIG. 9 is a pictorial representation of data structures employed by the vector flow processor of FIG. 6 to carry out the preferred embodiment of the invention.

The input buffers 283 and 284 used to calculate velocity values are shown pictorially in FIG. 9. Each buffer contains a set of three complex beam samples, represented as dots, at each sample range R. A 3 by 3 window 330 of nine samples in each buffer 283 and 284 is employed in each calculation, and this window is moved through the arrays in the range direction. As indicated at process step 331 in FIG. 8, the central sample 332 in the windowed current array 283 is multiplied by the complex conjugate of each of the nine windowed samples in the previous array 284. As indicated at process step 333 (FIG. 8), the nine values which result from these multiplications are summed with the corresponding nine values in a total array (TL) 335. Total array 335 is a three-dimensional array ($3 \times 3 \times R$) which stores the nine results of the multiplications at each sample range R.

After each sample 332 is multiplied and the results summed in total array (TL) 335, the mid processor loops back at decision step 337 (FIG. 8) to increment the range counter at step 338 and to repeat the calculations at the next range sample. When the last range has been calculated, therefore, the total array (TL) 335 stores a 3 by 3 array of values at each of its ranges R. These are the nine values defined above in equations (1) through (9), and while it is possible to calculate flow values from these data, in the preferred embodiment the same beam angle data are acquired at least four times and the process loops back at decision point 340 (FIG. 8) to repeat the computations using the next batch of beam sample data. The range counter is reset at step 341 and the measurement repeat counter is incremented at process step 342 before the mid processor loops back and waits for the next data to become available. At the completion of the desired number of repetitions, therefore, the total array 335 (FIGS. 6, 9) stores the sum of each of the complex conjugate multiplications performed at process step 331 (FIG. 8) which are the correlation values of equations (1) through (9).

The process of FIG. 8 then enters a loop indicated generally at 350 in which the velocity values and direction values at each range (R) are calculated using the accumulated totals in the total array (TL). First the range counter (R) is reset at process step 351 and then the velocity and angle are calculated at the mid beam range sample (R) as provided in equations (11), (13), (14) and (15) and indicated at process step 352. The calculated values are then provided to the display system as indicated at process step 353. Calculations continue until the velocity and direction values at each sample range (R) have been calculated and supplied to the display as determined at decision point 354. Thus, while in loop 350, the mid processor calculates and supplies to the display a stream of values for successive ranges (R) in one beam at the steering angle ($\theta$).

The mid processor loops back and, incrementing the range counter at process step 335, continues to calculate values for other beam angles ($\theta$) until the scan is complete. When the last beam angle ($\theta$) has been produced, as determined at decision point 356, the process exits at 357. Otherwise, the beam angle counter is incremented at process step 358 and the mid processor loops back to await sufficient available data to begin processing the next beam angle ($\theta$).

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In a coherent imaging system using vibratory energy for producing an image, a method of obtaining an indication of magnitude and direction of flowing reflectors, comprising the steps of:
    a) producing a plurality of vibratory energy pulses at time intervals ($\Delta T$);
    b) receiving echo signals resulting from reflection of the vibratory energy pulses by the flowing reflectors;
    c) forming a plurality of signals representative of a plurality of receive beams produced from each echo signal steered in a corresponding plurality of beam angles;
    d) sampling the plurality of signals representative of receive beams for a set of successive ranges along each receive beam;
    e) correlating a central sample from signals representative of one of the receive beams formed from one of the echo signals with a corresponding sample from signals representative of said one of the receive beams formed from another one of the echo signals and the surrounding samples from signals representative of the plurality of receive beams formed from said another one of the echo signals to produce a set of correlation values;
    f) calculating velocity of the reflectors at the central sample in both the range direction and cross range direction from the set of correlation values;
    g) controlling intensity of an image pixel which corresponds to location of the central sample with the calculated velocity;
    h) repeating steps e), f) and g) for central samples located at successive range values along said one of the receive beams; and
    i) repeating steps a) through h) in which the plurality of receive beams formed in step c) are steered in a different beam angle.

2. The method of claim 1 wherein step f) further includes calculating direction of the moving reflectors and step g) further includes controlling chrominance of said pixel with the calculated direction.

3. In a vibratory energy imaging system, a method of producing an image with an indication of magnitude and direction of flowing reflectors, comprising the steps of:
    transmitting a first vibratory energy beam toward said reflectors directed at an angle $\theta$ so as to produce a first set of receive beams;
    sampling said set of receive beams disposed around said angle $\theta$;
    storing said samples in a first input buffer;
    transmitting a second vibratory energy beam toward said reflectors directed at said angle $\theta$ so as to produce a second set of receive beams;
    sampling said second set of receive beams disposed around said angle $\theta$,
    storing said samples in a second input buffer;
    correlating flow of a reflector at a sample range of each of said receive beams at angle $\theta$ in both range and cross range directions using the stored samples in the first and second input buffers; and
    controlling, in accordance with the range and cross range flow measurements, a pixel in a two-dimensional image which corresponds in location to said samples range and beam angle $\theta$.

4. The method of claim 3 wherein the step of correlating flow of a reflector at a sample range is repeated at a series of sample ranges to control corresponding pixels in said two-dimensional image in a line along beam angle $\theta$.

5. The method of claim 4 further comprising repeating the steps thereof for other beam angles so as to control corresponding pixels in the entire two-dimensional image.

6. In a coherent imaging system using vibratory energy for producing an image, apparatus for obtaining an indication of magnitude and direction of flowing reflectors, comprising:

transmitter means for producing a plurality of vibratory energy pulses at time intervals of duration $\Delta T$;

receiver means for receiving echo signals which result from reflection of the vibratory energy pulses by the flowing reflectors and for forming a plurality of sampled receive beam signals for beams steered in a corresponding plurality of beam angles;

a mid processor for receiving the sampled receive beam signals from the receiver means, correlating samples from one echo signal with corresponding samples from another echo signal, and calculating velocity of the reflectors at a central sample in both the range and cross range directions; and display means for receiving the calculated velocities from the mid processor and being operable in response thereto to control brightness and color of pixels in an image in accordance with said calculated velocities.

7. The coherent imaging system of claim 6 wherein said receiver means for receiving echo signals is adapted to form three receive beam signals for beams steered in each of three corresponding beam angles.

8. The coherent imaging system of claim 7 wherein said mid processor comprises a vector flow processor including first and second phase rotators and a latch, each of said phase rotors and said latch being responsive to one set of said sampled receive beam signals from said receiver means, first summing means for summing output signals from said latch with all other sets of said sampled receive beam signals from said receiver means, said first and second phase rotators being adapted to rotate said one set of sampled receive beam signals by an angle $+\Delta\theta$ and $-\Delta\theta$, respectively, second summing means for summing the $+\Delta\theta$ rotated output signals from said first phase rotator with all other sets of $+\Delta\theta$ rotated sampled receive beam signals from said receiver means, third summing means for summing the $-\Delta\theta$ rotated output signals from said second phase rotator with all other sets of $-\Delta\theta$ rotated sampled receive beam signals from said receiver means, first, second and third input latches coupled to said first, second and third summing means, respectively, for receiving output signals therefrom simultaneously, random access memory means for storing output signals from said first, second and third input latches, and processor means for calculating flow values at predetermined sample ranges along a mid beam $\theta$ from the stored signals in said random access memory means.

9. The coherent imaging system of claim 8 wherein said random access memory means comprises a previous input buffer, a current input buffer, and a next input buffer, said processor means coupled to calculate velocity and direction values based on data stored in said previous and current input buffers, said system further comprising an output latch coupled to said processor means for producing velocity and direction data for display by said coherent imaging system.

* * * * *